United States Patent
Husted et al.

[11] 3,946,161
[45] Mar. 23, 1976

[54] DISTRIBUTED BIT STUFF DECISION TRANSMISSION

[75] Inventors: John M. Husted, Vienna, Va.; Ova Gene Gabbard, Germantown; William G. Schmidt, Rockville, both of Md.

[73] Assignee: Communications Satellite Corporation, Washington, D.C.

[22] Filed: Oct. 26, 1970

[21] Appl. No.: 84,105

[52] U.S. Cl. .......................... 179/15 AF; 179/15 BS
[51] Int. Cl. .............................................. H04j 3/06
[58] Field of Search ....... 179/15 BS, 15 BA, 15 AL, 179/15 AF; 178/69.5 R; 325/4

[56] References Cited
UNITED STATES PATENTS

| | | |
|---|---|---|
| 3,569,631 | 3/1971 | Johannes et al. ................ 179/15 AF |
| 3,646,271 | 2/1972 | Shigaki ........................... 179/15 AF |
| 3,651,263 | 3/1972 | Lindback ......................... 179/15 AF |
| 3,652,800 | 3/1972 | Dooley ............................ 179/15 AF |
| 3,663,760 | 5/1972 | DeWitt ............................ 179/15 AF |

Primary Examiner—Maynard R. Wilbur
Assistant Examiner—H. A. Birmiel

[57] ABSTRACT

A stuff decision code word of multiple bit length is transmitted over a number of frames equal to the number of bits per stuff decision code word. Advantage is made of a unique word used for burst synchronization wherein a common code word is used for both stuff decision and burst synchronization. A hierarchy of bursts is established to identify the particular channel of information to which the stuff decision is associated.

4 Claims, 4 Drawing Figures

DISTRIBUTED BIT STUFF DECISION TRANSMISSION

The invention herein described was made in the course of or under a contract or subcontract thereunder, with the Department of the Army.

BACKGROUND OF THE INVENTION

1. Field of the Invention

This invention relates generally to a Time Division Multiplexed (TDM) digital communications satellite system and more particularly to a technique for transmitting bit-stuffing decisions in an asynchronous TDM satellite system.

2. Description of the Prior Art

In a TDM digital satellite communications system having a plurality of earth stations each earth station may be required to accept data inputs from several terrestrial sources whose information rate varies relative to the TDM system information rate. Though the difference in information rate may vary the system design insures that the TDM system information rate is higher than the data information rate. To accommodate the difference in information rate the TDM system inserts extra pulses (pulse stuffing) in the incoming data in order to equalize the bit rates. At a receiver the stuffed pulses, which carry no information, are removed when the signal is demultiplexed.

The decision to stuff or not to stuff must be conveyed to the receiver. If the decision to stuff is made, then the receiver must be so instructed in order that the stuffed pulses may be properly removed. The stuff decision is binary (yes or no) and can be conveyed by only one bit. However, there is a finite probability that channel noise would corrupt this bit so that the stuff decision bit will be received in error. When an error occurs in the transmission of stuff decision, blocks of data will be processed incorrectly thereby degrading the communication channel performance significantly.

To reduce the probability of error in transmitting the stuff decision below the probability of channel noise corrupting a bit, i.e., below the probability of channel bit error, a standard approach is to encode the stuff decision into a digital word of multiple bit length. The receiver will detect this multiple bit word if the number of bit errors is below a threshold determined by the desired probability of detecting the stuff decision correctly. However, in a TDM digital satellite communications system wherein each earth station transmits, in one time frame, a burst of information, each bit that is allocated to the stuff decision word (signalling) is a bit in the burst time slot that is no longer available to carry information. If the efficiency of the system is defined as the ratio of available information bit time slots in a burst to the length of the burst then every bit added to the stuff decision word will decrease the efficiency of the system.

The present invention has the advantage of transmitting stuff decision information through a TDM digital satellite communications system with a probability of error much less than the bit error probability of the communication channel while requiring a minimum of one information bit per burst for each earth station.

SUMMARY OF THE INVENTION

In accordance with this invention each earth station utilizes a stuff decision code word of relatively long bit length. However, rather than transmitting the entire stuff decision code word every frame period, i.e., with each station burst, only one bit of the stuff decision word is transmitted every frame period so that the stuff decision word is distributed over a multiplicity of frames equal to the number of bits in the stuff decision code word. At a receiver a coded sequence identical to the transmitted stuff decision code word is generated and compared with the received code word. If the two code words correlate with some allowable error tolerance the receiving station would decide that the distributed stuff decision code word has been identified.

The decision that a stuff has been made or has not been made is conveyed by the complement or no-complement of the distributed stuff decision code word. The detector that compares the received stuff decision code word with the stuff decision code generated at the receiver determines whether pulse stuffing has occurred by detecting a minimum correlation between the code words (transmitted stuff decision code word complemented) while maximum correlation would indicate that there is no pulse stuffing (transmitted stuff decision code word not complemented).

In an earth station burst which is transmitted to the satellite there are a number of channels (sub-bursts) of information intended for different subscribers. These sub-bursts must be stuffed individually in order to equalize the data rate of these individual channels with the TDM transmission system. Since the present system can convey a stuff decision only with respect to one channel in a burst every N frames, wherein N is the bit length of the stuff code, a technique is provided, hereinafter described, for identifying the channel of information to which the stuff decision applies. Also, as will hereinafter be described, advantage will be taken of the technique of acquiring burst synchronization via a distributed unique word as disclosed in application Ser. No. 84,084, now abandoned, by Loffredo filed on this date, wherein rather than transmitting a distributed pulse stuffing decision code word and a separate distributed unique word, only one common code word is used for both the pulse stuffing decision and burst synchronization.

DETAILED DESCRIPTION OF THE DRAWINGS

Figure 1:
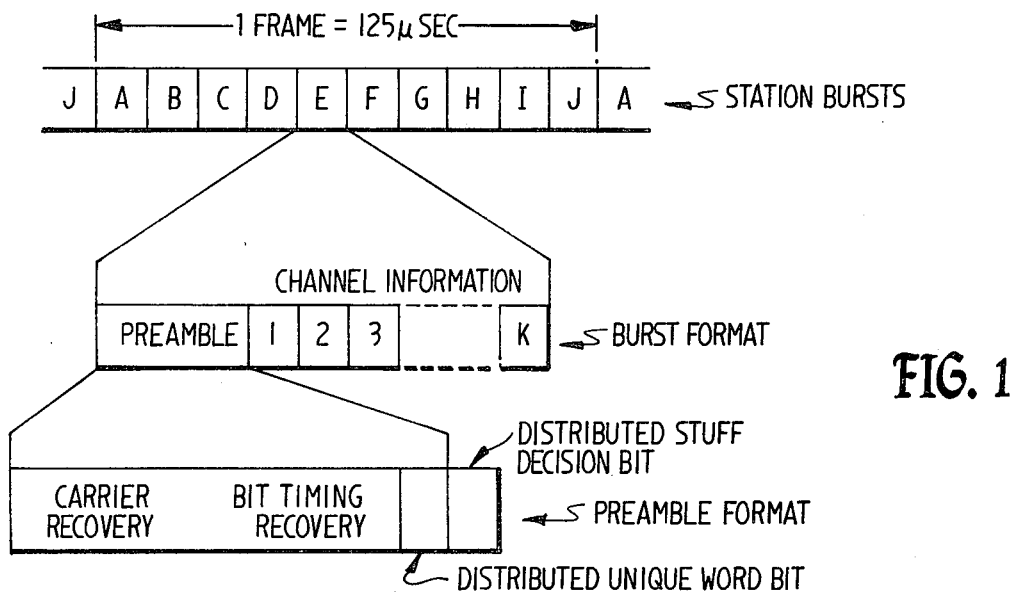
FIG. 1 is a diagram of a frame burst and preamble format in a TDM system.

Referring to FIG. 1 there is shown a typical frame format for 10 earth stations A–J. During one frame period each earth station transmits a single burst comprising a preamble and a number of channels of information. The preamble will include, for example, 10 bits for carrier recovery, 10 bits for bit timing recovery, one bit for the distributed unique word used in the previously mentioned Loffredo application and, in the present invention, one bit of the distributed stuff decision code word. To insure a high probability of properly detecting the stuff pulse decision a stuff decision code word of predetermined length must be chosen. For example, if the probability of improperly detecting the stuff decision code word should be $< 1 \times 10^{-20}$ in a system wherein the probability of bit error $= 1 \times 10^{-4}$ then a stuff decision code word of 128 bits could provide this stuff decision protection with ample margin. Under these conditions it is possible to allow bit errors of up to 10 bits per code word and still be assured of properly detecting the stuff decision code word. The distributed stuff decision code word of 128 bit length is then distributed over 128 frames. The information portion of the burst could comprise, for example, four distinct channels of information intended for different subscribers.

In a system requiring a pulse stuffing scheme it is necessary to instruct the receiver as to (1) whether there has been stuffing, (2) where in the burst the pulses have been stuffed and (3) how many pulses have been stuffed. The decision as to how many pulses to stuff is dependent on the difference in information rate between the incoming data rate and the information rate of the system. The difference in rates is then equal to the number of bits stuffer per decision multiplied by the number of stuff decisions.

In the present invention the location in the burst of the stuffed pulses is preassigned so that information as to where in the burst the pulses are stuffed need not be transmitted. The number of bits stuffed in any stuff decision is constant and preassigned, therefore this information need not be transmitted. The only information needed to be transmitted then is whether there will be stuffing (yes or no) for this also indicates the number of stuff decisions.

The preamble format has been shown to include both one bit of a distributed stuff decision code word and one bit of a distributed unique word for burst synchronization. However, since the only information required to be transmitted with respect to the pulse stuffing decision is whether or not there is a stuff decision (yes or no) advantage is made of the distributed unique word so that only one common distributed code word need be transmitted. The distributed unique word will contain the stuff decision (yes or no) in the following manner. If there is no decision to stuff then the distributed unique word would be transmitted not complemented. At the receiver, the detector will detect the transmitted distributed unique word and compare it to a stored replica of the unique word. If there is maximum correlation then the receiver will know it has properly detected the unique word for purposes of burst synchronization and since there is maximum correlation it will know that no pulses have been stuffed. If there is a decision to stuff then the logic complement of the distributed unique word will be transmitted. At the receiver, the detector will compare the stored replica with the transmitted complemented unique word and will detect a minimum correlation. Detection of this minimum correlation will still indicate burst synchronization, however, the minimum correlation will indicate that pulse stuffing will occur. Though a separate burst time slot may therefore be used for transmission of a distributed stuff decision code word the remainder of the discussion will assume that the distributed unique word will contain information both as to pulse stuffing and burst synchronization.

Figure 2:
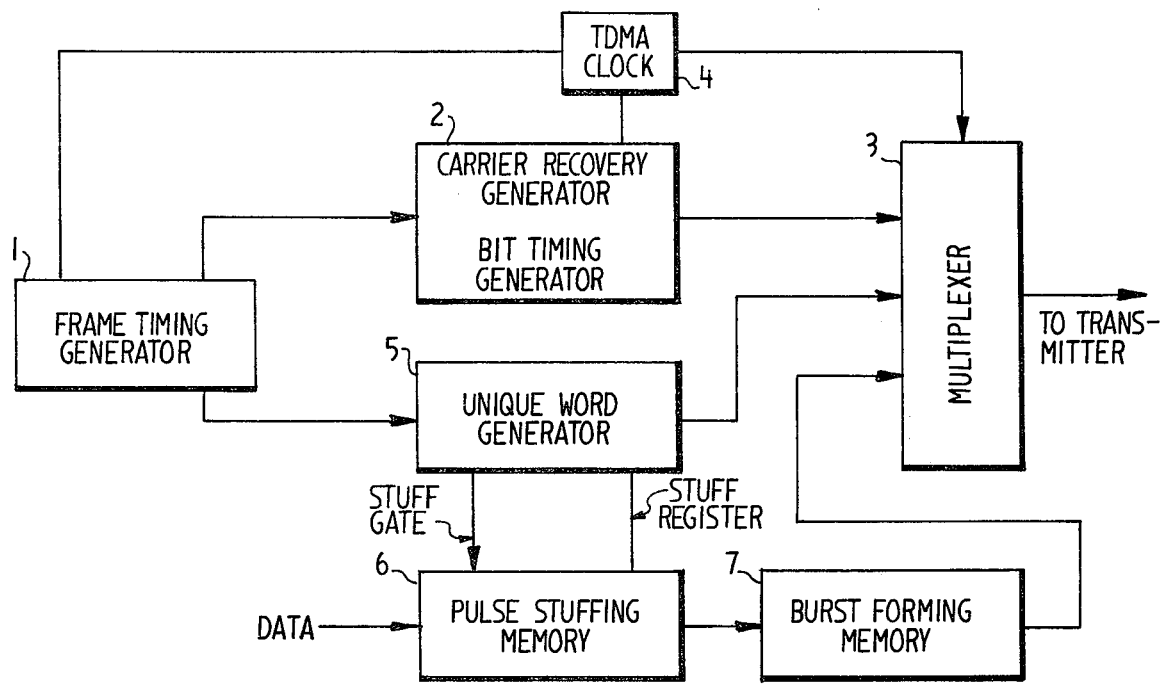
FIG. 2 is a block diagram of a transmitter.

Referring to FIG. 2 there is shown a transmitter used in the present invention. At the transmitter the burst to be transmitted as one burst in the frame is generated in the following manner. A frame timing pulse from pulse generator 1 is fed to carrier and bit timing generator 2. The carrier and bit timing information is then clocked into multiplexer 3 by clock 4 in a manner well known in the art. Then unique word generator 5 is clocked at the frame rate by frame timing generator 1 to generate one bit of the distributed unique word. This one bit is then clocked into multiplexer 3 via clock 4.

Whether the distributed unique word is transmitted complemented or not complemented is determined in the following manner. Data to be transmitted is written or clocked into pulse stuffing memory 6. This data is then read out of memory 6 at a higher clock rate determined by the information rate of the transmission system. Assuming initially that the memory 6 is filled then when data is read out due to the higher read out rate of the data the amount of data stored in memory 6 will decrease. If this decrease in storage continues eventually the memory will not be storing any data. To prevent this, the state when the memory is half full, for example, is detected and a stuff request pulse is tranmitted to distributed unique word generator 5. Upon reception of the stuff request pulse the generator 5 will during the proper time, as hereinafter discussed, transmit the complement of the distributed unique word thereby indicating that the stuff decision has occurred. Upon completion of transmission of the complemented distributed unique word a stuff gate pulse is fed to memory 6 from generator 5 which enables memory 6 to stuff a predetermined number of pulses in a predetermined place in the burst. The data including the stuffed pulses is then fed into burst forming memory 7 where the data is formed into bursts, as is known in the art, and then clocked into multiplexer 3 via clock 4.

One unique word generator 5 may be a pseudo noise generator of a type shown in the Loffredo application but also having the capacity to generate the complement of the unique word.

Figure 3:
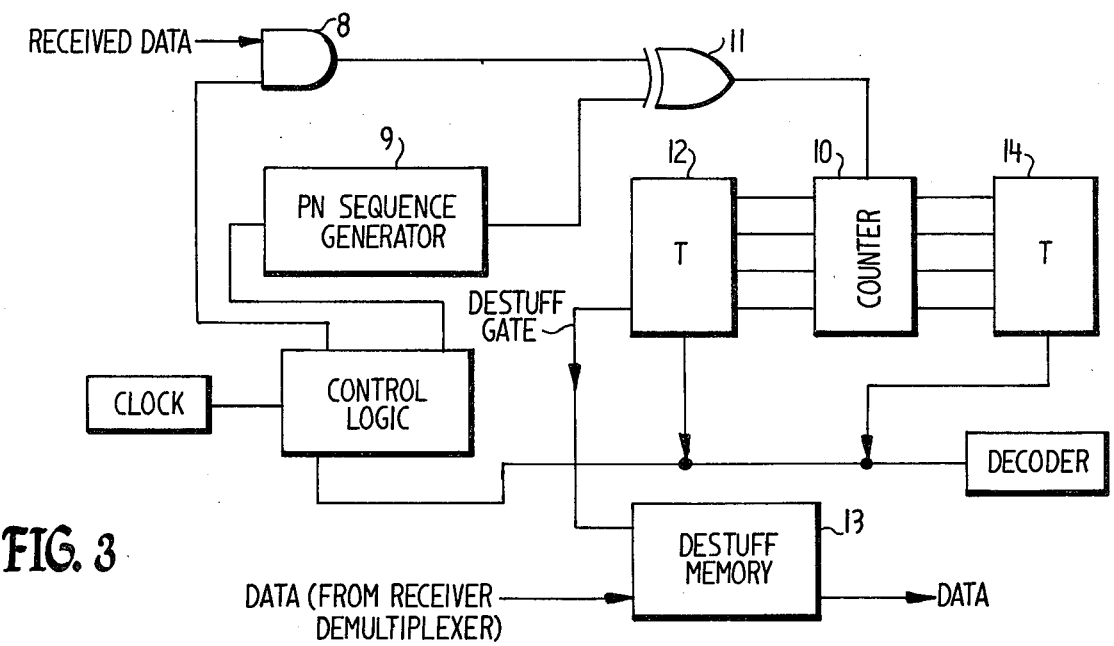
FIG. 3 is a block diagram of a distributed code word detector.

At a receiver, after recovering the carrier and clock, the distributed unique word would be detected in the manner disclosed in the Loffredo application with one difference which would enable detection of the complemented distributed unique word. Referring to FIG. 3, there is shown the distributed unique word detector of the Loffredo application including one extra threshold detector. Assuming the complemented distributed unique word is being received at gate 8 it will be compared with the stored replica of the distributed unique word which is not complemented and which is stored in register 9. The counter 10 will then count a minimum correlation from comparator 11 set by threshold 12 which not only will indicate burst synchronization but will also indicate the decision to pulse stuff. As a result a destuff pulse from threshold 12 is sent to destuff memory 13.

At memory 13 incoming data including the stuffed pulses is being written in at a rate which is higher than the rate at which data is being read out. Upon receipt of the destuff pulse memory 13 ceases to write in data for the duration of the destuff pulse which is generated at a time determined by the preassigned stuff format. As a result the data being written in this data without the stuffed pulses. If the received distributed unique word is not complemented then counter 10 will count to a maximum set by threshold 14 and memory 13 will not be instructed to stop writing since no pulse stuffing has occurred.

As noted previously, the burst of each station contains channels of information destined for individual subscribers. The data rate of each individual subscriber may differ from each other and therefore may differ individually from the information rate of the transmission system. For this reason a separate stuff decision must be transmitted for each specific subscriber.

Figure 4:
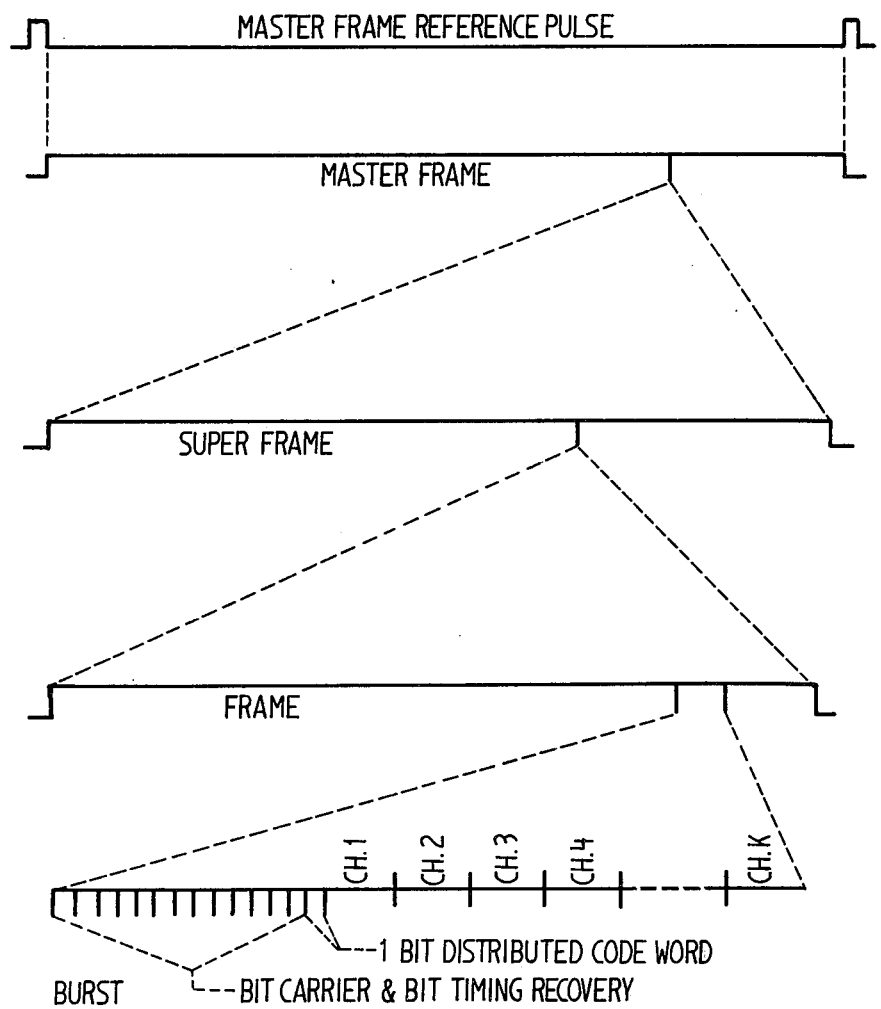
FIG. 4 is a diagram of a frame-burst hierarchy.

The system of the present invention can convey only one stuff decision per burst every N frames where N is the bit length of the stuff decision code word. That is, every N frames one stuff decision can be transmitted which refers to the stuff decision concerning one channel or subscriber. To identify the particular subscriber to which the stuff decision applies the following scheme may be used. Referring to FIG. 4 there is shown a hierarchy of bursts. This hierarchy would consist of a superframe defined as a group of consecutive frames required to convey one complete distributed code word. If there are 128 bits in the distributed code word then it requires 128 frames to transmit the entire distributed code word, therefore, 128 frames would equal one superframe. Then, for every channel in a burst there is a superframe. If there are 100 channels in a burst then there are 100 superframes which constitute a masterframe. Having established this hierarchy if a stuff decision is made as to channel number 5 in the burst (the channels being ordered) then the distributed stuff decision code word will be transmitted in superframe number 5 and the receiving station will know to associate the stuff decision with channel number 5. Establishing superframe timing which is needed to identify the beginning of each superframe in the masterframe would be known in the art.

The size of pulse stuffing memory 6 at the transmitter should now be considered. If the data stored in memory 6 (which receives data from a specific subscriber) falls below a predetermined amount (e.g. half full) then, as discussed previously, the decision is made to pulse stuff. However, pulse stuffing cannot occur until the superframe associated with that channel occurs or else the stuff decision will be incorrectly associated. For example, during superframe 80 (assuming 100 superframes) channel 5 generates a stuff request 25 superframes must elapse before an associated complemented stuff decision code can be sent. During the time needed to reach superframe 5 the data stored in memory 6 continues to decrease. Therefore, in order to prevent memory 6 from being emptied it must be sized accordingly. For example, if the stuff decision is made just after the start of a superframe associated with that channel then during that superframe the complement of the distributed stuff decision code word cannot be transmitted and the particular channel may have to wait a period of time equal to a masterframe before it can transmit the complemented code word and the stuffed pulses. Therefore, the memory 6 must be large enough to account for the emptying of memory 6 during this time period. However, if it is known that a particular subscriber constitutes a high data traffic channel thereby indicating that it will have to pulse stuff at a frequency above the average, then the size of memory 6 may be reduced by assigning that channel more than one superframe in the masterframe for pulse stuffing and spacing them over the masterframe. In this manner the complemented stuff decision code word may be transmitted more often thereby allowing the use of a smaller memory.

What is claimed is:

1. In a time division multiplexed (TDM) communications system wherein the incoming data rate differs from the TDM information rate and wherein the data to be transmitted is formed in bursts a method for transmitting the decision to stuff comprising the steps of:
  a. generating the complement of a stuff decision code word in response to a decision to stuff or the no-complement of a stuff decision code word when there is no decision to stuff;
  d. distributing said code word over a number of frames in a burst from one station;
  c. transmitting said distributed code word;
  d. receiving said distributed code word; and
  e. detecting either the complement or the noncomplement of the distributed stuff decision code word.

2. The method of claim 1 wherein said stuff decision code word is distributed over a number of frames equal to the number of bits in the code word.

3. The method of claim 2 wherein the step of detecting the complement of the distributed stuff decision code word comprises storing the received complement of said code word; storing a replica of the stuff decision code word; comparing said complement code word and said stored replica of the code word; and generating a decision to stuff pulse in response to a minimum correlation.

4. The method of claim 2 wherein the step of detecting the no-complement of the distributed stuff decision code word comprises storing the received no-complement of said code word; storing the replica of the stuff decision code word; comparing said no-complement code word and said stored replica of the code word; and generating a pulse in response to a maximum correlation.

* * * * *